Nov. 18, 1958 F. A. KROHM 2,860,365
WINDSHIELD WIPER ARM ASSEMBLY
Filed June 24, 1955 2 Sheets-Sheet 1

INVENTOR.
FRED A. KROHM
BY
Charles S. Penfold
ATTORNEY

Nov. 18, 1958 F. A. KROHM 2,860,365
WINDSHIELD WIPER ARM ASSEMBLY
Filed June 24, 1955 2 Sheets-Sheet 2

INVENTOR.
FRED A. KROHM
BY
Charles S. Penfold
ATTORNEY

United States Patent Office 2,860,365
Patented Nov. 18, 1958

2,860,365

WINDSHIELD WIPER ARM ASSEMBLY

Fred A. Krohm, Hobart, Ind., assignor to The Anderson Company, a corporation of Indiana Application June 24, 1955, Serial No. 517,837

7 Claims. (Cl. 15—255)

This invention relates generally to windshield wiper equipment and more particularly is directed to improvements in wiper arm structure.

The majority of wiper arms now in use include an inner shaft attaching section, an outer blade carrying section pivotally connected to the inner section, and a biasing means or elongated spring operatively connected to the inner section and also to the outer section at a location considerably forward of the pivotal connection between the arm sections for urging the outer section toward a windshield.

With the foregoing in mind, one of the important objects of the subject invention is to provide an improved biasing assembly or arrangement for directing the outer section with a blade thereon toward a windshield. This biasing assembly or device preferably comprises a relatively short spring and a lever which are located at the inner extremity of the outer arm section as distinguished from the conventional biasing means of the character above referred to in which the outer end of a spring is attached to the outer arm section at a point considerably forward of the pivotal connection between the arm sections.

More particularly, the lever of the biasing assembly has its inner end pivotally connected to the inner extremity of the outer arm section and its outer end extending longitudinally and forwardly. The spring has its inner end connected to the inner arm section and its outer end to the forward outer end of the lever so as to obtain a leverage action for urging the outer arm section toward a windshield in a manner which will be described more in detail subsequently.

A significant object of the invention is a provide an arm assembly of the kind above described in which a cap is movably mounted on the outer arm section for covering the inner arm section and the biasing means serves to influence movement of the cap.

A specific object of the invention is to provide connection means for rockably or pivotally attaching the cap to the outer arm section and individual cam means associated with the connection means for engaging the lever in a manner to hold the cap in a covering position or in an elevated position to permit access to the means employed for fastening the inner arm section to a shaft.

Another object of the invention is to provide a modified structure in which the cam means are eliminated and the lever is directly interconnected with the cap.

Other objects and advantages of the structure will become apparent after the description hereinafter set forth is considered in conjunction with the drawings annexed hereto.

Figure 3:
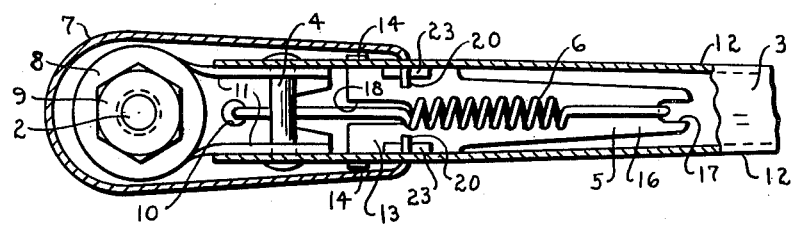
Figure 3 is a top view of the structure shown in Figure 2, with portions in section to illustrate constructural details.
Figure 1:
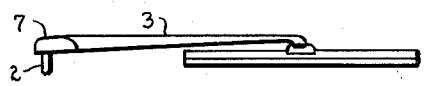
Figure 1 is a side view of the wiper arm and a blade attached thereto.

This application is a continuation-in-part of my copending application Serial No. 329,366 filed January 2, 1953 and is related to the subject matter of my copending application Serial No. 625,977 filed December 3, 1956.

Referring more particularly to the drawings, the arm structure, among other things, includes an inner section 1 adapted for detachable connection with a shaft 2, an outer blade carrying channel section 3, pivotally connected to the inner section by a pivot 4, a lever 5, a helical spring 6, and a cap 7.

The means employed for attaching the inner section of the arm to the shaft may be constructed in any one of various ways, but as exemplified in the drawing includes a cylindrical formation 8 carried by the inner section, clutch means, not shown, disposed in the formation, and a nut 9 which when tightened on the shaft causes the clutch means to simultaneously grip the shaft and engage the formation to firmly secure the inner section in a desired radial position on the shaft.

Figure 2:
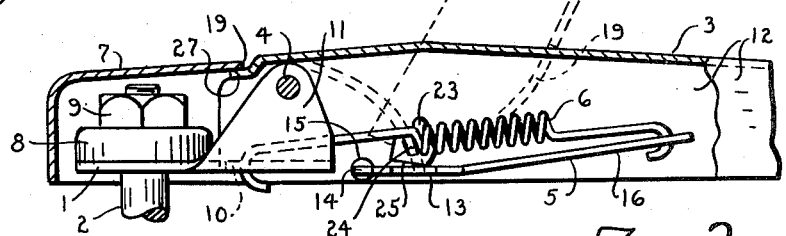
Figure 2 is an elevational side view of the arm structure, with portions in section to exemplify the operative relationship between certain components of the structure.

As illustrated in Figures 2 and 3, the inner arm section has a base portion provided with an aperture 10 for receiving an inner hooked end of the spring and is also provided with upturned parallel portions 11. The outer arm section 3 has flexible side walls 12 which straddle the upturned portions 11 of the inner section and the pivot 4 extends through the upturned portions and the side walls for pivotally connecting the arm sections together.

Figure 4:
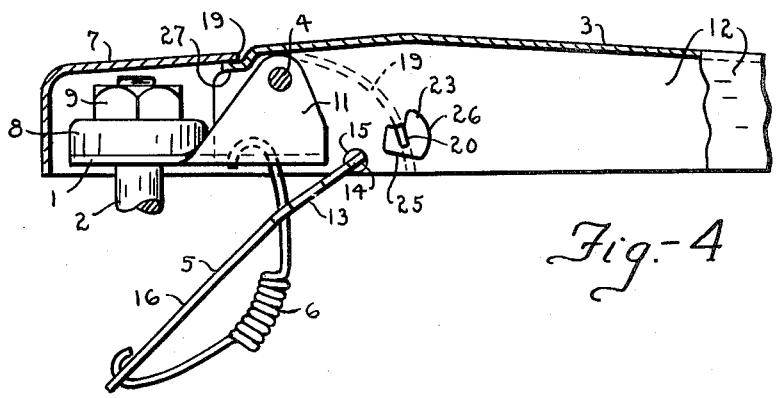
Figure 4 is a side view of the arm structure showing the method of assembling the lever and spring with the arm sections.
Figure 5:
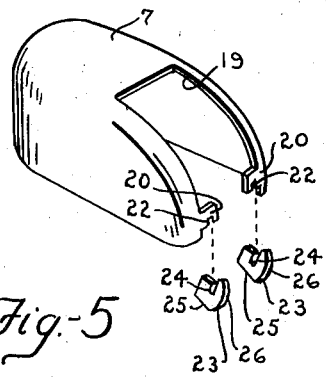
Figure 5 is a perspective view of the cap and the cam means associated therewith.
Figure 6:
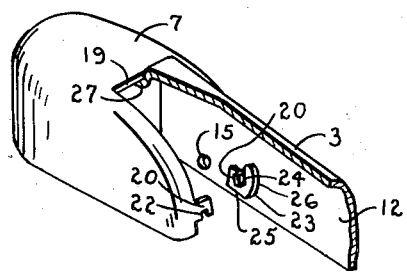
Figure 6 is a perspective view showing the cap associated with a fragment of the outer arm section and the manner of utilizing the cam means to lock the cap to said section.

The lever 5 preferably includes an inner portion 13 provided with projections 14 which extend outwardly into apertures 15 provided therefor in the side walls 12 of the outer channel section. Entry of the projections into the apertures 15 is readily accomplished by spreading the side walls apart. This lever also includes an outer portion 16 slightly offset from the inner portion 13, and is provided at its forward end with an opening 17, in the form of a notch, for detachably receiving an outer hooked end of the spring. The offset character of the levers serves to provide clearance for actuation of the spring and the inner portion 13 of the lever is provided with a slot 18 for clearance purposes in assembling the spring with the lever and the inner section of the arm. The lever is preferably attached to the outer arm section and the spring is then connected to the inner section and lever. More specifically in this regard, and as shown in Figures 3 and 4, after the lever is attached to the outer section and arranged in a depending position the inner end of the spring is attached to the inner section with a shank of the spring extending through the slot 18. The outer end of the spring is then hooked into the opening 17 in the outer end of the lever, after which the lever and spring are manually swung to the operative position shown in Figure 2 of the drawing to urge the outer blade carrying section toward a windshield.

Attention is directed to the fact that the line of force exerted by the spring is preferably located between the points of connection between the arm sections and between the lever and outer section to obtain the leverage action desired with the spring pulling on the lever to urge the lever in a counter-clockwise direction toward the base wall of the outer channel section.

The mode of movably supporting the cap 7 on the outer arm section and its operative relationship with the biasing means will now be described. The cap is provided with a relative large rectangular opening 19 within which the outer channel section is disposed when the cap is attached to the outer section. The cap may be supported on the outer section in various ways, but as herein shown, the cap is provided with a pair of flexible side walls having corresponding inturned formations or connection means 20 which extend into generally triangular openings 21 provided in the side walls 12 of the outer section. Since the side walls of the cap are flexible they may be spread apart sufficiently to permit insertion of the formations 20 into the openings 21. These openings will be referred to more in detail subsequently. Each of the formations is provided with a recess 22 which receives a locking element 23 preferably in the form of a cam. Each of the cam elements is provided with a notch 24, a straight surface edge 25 and a curved edge surface 26 constituting a cam surface disposed in a generally angular relationship with respect to the straight edge surface. The arrangement is such that when the elements are attached to the formations 20 on the cap, the recess 22 in each of the formations will receive a portion of an element and the notch 24 in each element will receive a portion of each formation to detachably interlock the cap and outer section so that the locking elements move with the cap whenever the cap is manipulated to the full line covering position over the inner section or to the elevated dotted line position illustrated in Figure 2.

Figure 7:
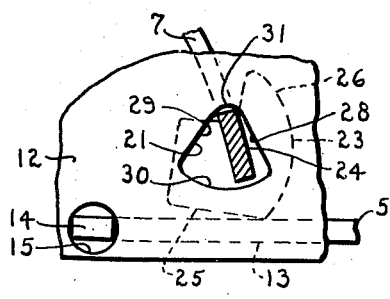
Figure 7 is an enlarged partial elevational view depicting details of the connection between the cap and outer arm section and the operative relationship between the cam means and the spring pressed lever when the cap is in covering position.

The cam elements 23 are so located that the biasing device serves to hold the elements interconnected with the formations 20 on the cap. More specifically in this respect, and as viewed in Figures 2 and 7, the inner portion 13 of the lever normally bears against the straight edge surfaces 25 of the elements to maintain the cap in the covering position above referred to. The cam elements also serve as stops assisting to maintain the biasing device in the operative position depicted in Figure 2.

Figure 8:
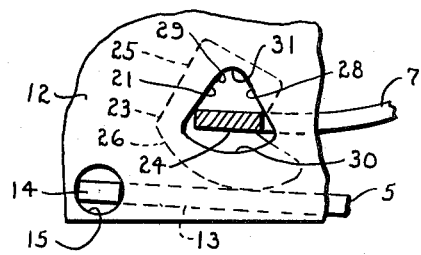
Figure 8 is a view similar to Figure 7 showing the relationship of the cam means and lever when the cap is in an elevated or open position.

When the cap is manually moved or swung from the covering position, through an arc of more than ninety degrees, to the elevated or open position shown by the dotted lines in Figure 2 and the disclosure in Figure 8, the curved cam edge surfaces 26 of the cam elements 23 will ride or slide on the lever and take the position shown in Figure 8. The pressure exerted by the spring serves to automatically hold the cap in any position to which it is moved as long as the cam surfaces 26 are engaging the lever. However, when the cap is swung a predetermined distance toward a convering position, the cam edges 26 will disengage the lever, and due to the clearance afforded by the edges 25, the spring will cause the cap to snap to the covering position. The covering or lowermost position of the cap is preferably determined by a stop or rest portion 27 provided on the outer arm section and which is forcibly engaged by a portion of the cap defining the opening 19 therein. When the cap is in this position the straight edges 25 of the elements 23 are disposed at clearance angles to cause the fore ends or points of the edges to engage the lever as clearly illustrated in Figures 2 and 7. Otherwise expressed, the points or lines of junction between the edges 25 and 26 engage the lever.

The elevated position of the cap as shown by the dotted lines in Figure 2 is preferably determined by the transverse edge of the opening 19 in the cap engaging the base wall of the outer channel arm section. Obviously, any means suitable for the purpose may be employed to predetermine the movable range of the cap.

The generally triangular or fan-shaped openings 21, above referred to, are of a size to provide sufficient clearance for rockable action or movement of the connection means or formations 20 therein to permit the cap to be manipulated without twisting or damaging the formations. More specifically in this regard, each of the openings is preferably defined by a pair of straight marginal edges 28 and 29 and a lower curved edge 30. The pairs of edges 28 and 29 converge to form what may be termed concave seats 31 which receive the upper edges of the formations 20 when the cap is in the covering position shown in Figures 2 and 7. When the cap is manually swung from the covering position toward the elevated position, the upper edges of the formations 20 will first rock or pivot on the seats and as the cap is moved farther to the right, the upper edges of the formations will move out of the seats 31 and ride down the straight edges 28 of the opening and as the cap approaches its final or elevated position the lower edges of the formations will also ride up on the straight edges 29 so that the edges of the formations will engage the straight edges 28 and 29 of the opening as clearly depicted in Figure 8. It is understood that insofar as the subject invention is concerned, the connections between the cap and outer arm section can be modified; that the size and/or shape of the openings 21 may be varied; and that if found desirable some part other than the lever of the biasing means could be made to directly engage the locking elements or the cap.

Figure 9:
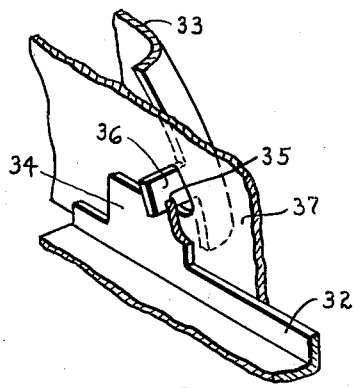
Figure 9 is a modified structure in which the lever is directly connected with the cap.

In the modification of the invention exemplified in Figure 9, the separate cam elements 23 are omitted and a spring pressed lever 32 is directly connected to a cap 33. More particularly, the lever is provided with a pair of upturned corresponding locking components 34 which are detachably received in notches 35 provided in the lower edges of inturned formations 36 extending from the cap through suitable openings therefor in the side walls of an outer arm section 37. In this arrangement, the lever through the action of the spring will hold the locking components 34 interlocked with the formations on the cap in a manner whereby the cap will automatically be held in substantially any position to which it is adjusted.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper arm comprising an inner section and a section pivotally connected to the inner section for supporting a blade, an elongated inflexible lever having one end pivotally connected to the pivotal section, an elongated spring having one end connected to the inner section and its other end to the lever at a location forward of the latter's connection with the pivotal section, a cap movably mounted on the arm for covering a portion of the arm, and said lever and cap being operatively connected so that the spring will cause the lever to influence movement of the cap.

2. A windshield wiper arm comprising an inner section and a section pivotally connected to the inner section for supporting a blade, an elongated lever having one end connected to the pivotal section, an elongated spring having one end connected to the inner section and its other end to the other end of the lever, a cap for covering at least a portion of the inner section, and means attaching the cap for movement with respect to the pivotal section directly cooperating with the lever through the action of the spring for influencing movement of the cap.

3. A windshield wiper arm comprising a shaft attaching section and a blade carrying channel section pivotally connected to the attaching section, an elongated lever having its inner end connected to the channel section, a spring having its inner end connected to the attaching section and its outer end to the outer end of the lever, said channel section being provided with openings, a cap for covering the attaching section, said cap having formations extending into the openings for supporting the cap for movement with respect to the sections, and cam means carried by the formations engaging the lever, the shape of the cams and their engagement with the lever being such that the lever due to the action of the spring thereon will cause the cap to be automatically held in either a covering position or an elevated position when manually moved to either of such positions.

4. A windshield wiper arm comprising an inner section and a channel section pivotally connected to the inner section for supporting a blade, an elongated lever having one end connected to the channel section, an elongated spring having one end connected to the inner section and its other end to the other end of the lever, a cap, means locking the cap to one of the sections for rockable movement for covering at least a portion of one of the sections, and said lever acting on said locking means for influencing the movement of the cap.

5. A windshield wiper arm comprising a shaft attaching section and a blade carrying channel section pivotally connected to the attaching section, an elongated lever having its inner end connected to the channel section, a spring having its inner end connected to the attaching section and its outer end to the outer end of the lever, said channel section being provided with openings, a cap for covering the attaching section, said cap having formations extending into the openings for supporting the cap for movement with respect to the sections, and cam means carried by the formations engaging the lever, the shape of the cams and their engagement with the lever being such that the lever due to the action of the spring thereon will cause the cap to be automatically held in either a covering position or an elevated position when manually moved to either of such positions, said cam means also serving to maintain the lever and spring in predetermined operative positions.

6. A windshield wiper arm comprising an inner section and an outer section pivotally connected to the inner section for supporting a blade, an elongated lever having one end connected to the outer section, an elongated spring having one end connected to the inner section and its other end to the other end of the lever, a cap supported for movement on one of the sections for covering at least a portion of one of the sections, and said lever being directly connected to the cap for locking the cap on the section on which it is supported and serving to influence movement of the cap through the action of the spring.

7. A windshield wiper arm comprising an inner section and a channel section pivotally connected to the inner section and carrying means for supporting a blade, said channel section having a pair of side walls, an elongated lever having an inner end and an outer end, means on said side walls and means on the inner end of the lever cooperating with the means on the side walls serving to pivotally connect the lever to the side walls, an elongated spring having an inner end connected to the inner section and an outer end connected to the outer end of the lever for urging the channel section toward a windshield, and said side walls being flexible to facilitate connection and disconnection of the lever and side walls.

References Cited in the file of this patent

UNITED STATES PATENTS

| | | |
|---|---|---|
| 2,528,258 | Zaiger | Oct. 31, 1950 |
| 2,576,077 | Ozarowski | Nov. 20, 1951 |